Patented June 9, 1942

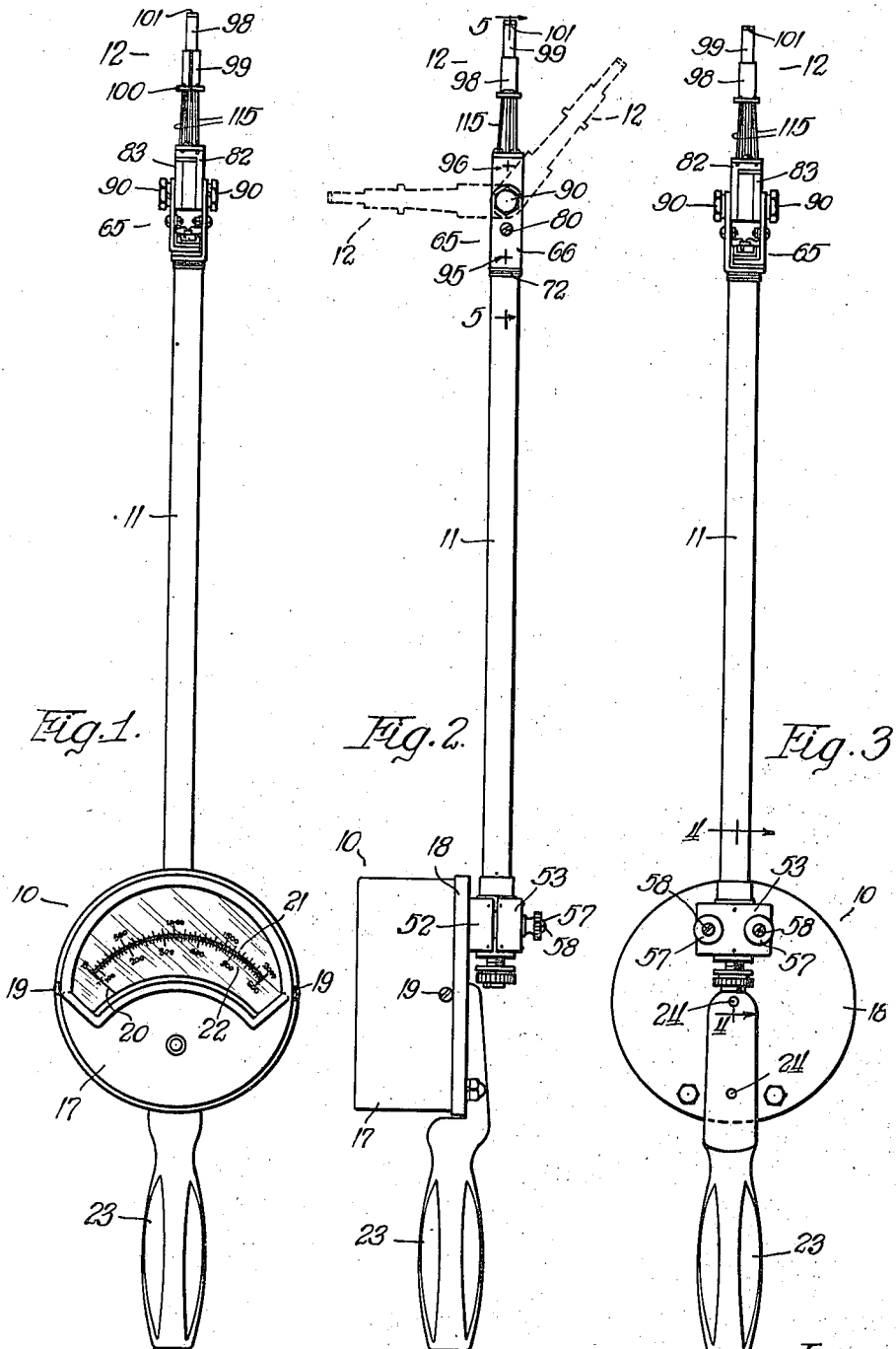

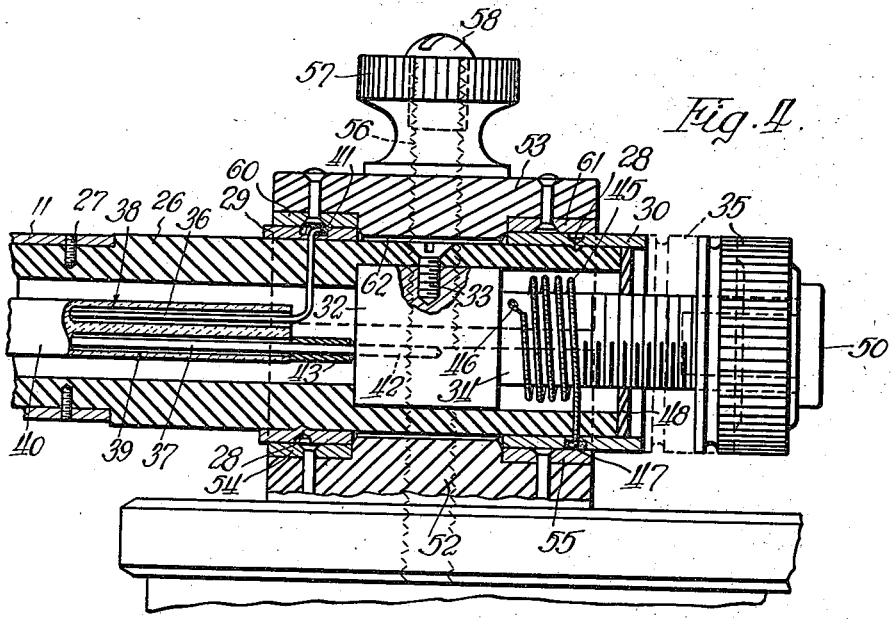

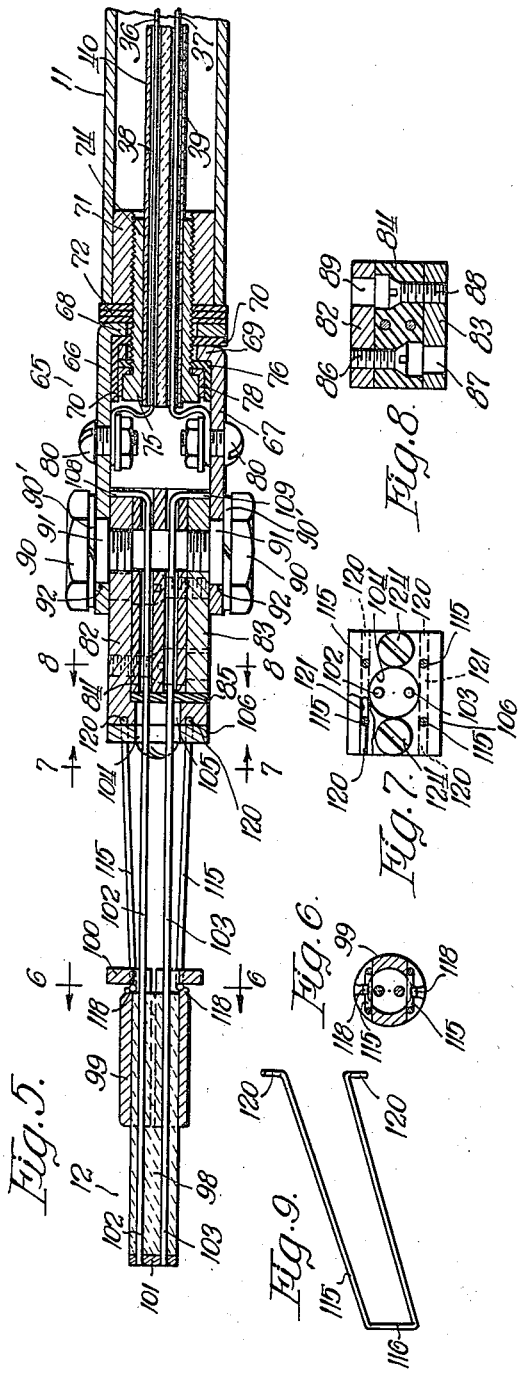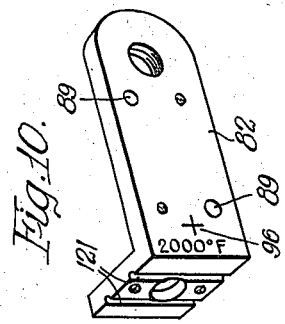

2,285,457

UNITED STATES PATENT OFFICE 2,285,457

PYROMETER

John A. Obermaier, Chicago, Ill.

Application February 16, 1938, Serial No. 190,721

15 Claims. (Cl. 73—359)

This invention relates to improvements in pyrometers.

While the invention is particularly applicable to surface temperature pyrometers for measuring the temperatures of production machinery and products such, for example, as fly wheels, shafts, heated drums, calenders and the like, and in connection with plastic molding, die casting, rubber plants, paper mills, and elsewhere, it is to be understood that in its broader aspects the present invention is not limited to surface temperature pyrometers but may be embodied in other pyrometers as suitable and desired.

One of the main objects of the invention is to provide a pyrometer which will given an accurate and almost instantaneous reading by merely pressing the tip of the thermocouple part of the pyrometer in contact with the surface of the object, the temperature of which it is desired to measure, or by merely pushing the tip of the thermocouple into the object, or, in the case of heat zones, liquids, and molten metal, by placing the hot junction of the thermocouple therein.

It is a further object to provide a pyrometer comprising an indicator and handle unit, and an extension arm adapted to be quickly secured and connected to the indicator and handle unit and quickly detached therefrom. The extension arm is provided at its outer end with a yoke for receiving any of a group of various types of thermocouples adapted for interchangeable pivotal attachment to the yoke. The thermocouples may be swung about their pivotal supports to any angular position, and the extension arm is capable of being turned about its longitudinal axis and clamped in any angular position to the indicator and handle unit. With this combination of angular movements it is possible to place the thermocouple unit in any position to permit it to contact the heated surfaces and at the same time to position the front of the instrument toward the operator so that the temperature may be ascertained at a glance.

It is also an object to provide a thermocouple which will pick up the temperature to be measured with great speed and which, at the same time, will have the desired strength. This is accomplished by separating the tip of the thermocouple from the base. The means which separates the tip of the thermocouple from its base supports the tip on the base and is strong, and, at the same time, of minimum mass, so that the instant the tip is applied to the object the thermocouple element is heated and an accurate reading is produced. The reduction in mass provides maximum thermal insulation. At the same time, the mass of the tip supporting and separating means is reduced without sacrificing the desired strength, and the construction whereby these advantages are obtained is a simple and natural one.

Another object is to provide a device having a scale calibrated for high temperature indications and another scale calibrated for low temperature indications, together with improved means for connecting the thermocouple to the instrument through a resistance element for high temperature readings on the high temperature scale and for short circuiting the resistance element for low temperature readings on the low temperature scale. In this connection, the invention also provides a third position for the switch control at the end of the extension arm which is mounted on the indicator.

It is a further object to provide a self-contained portable pyrometer embodying the features set forth.

Further objects and advantages of the invention will be apparent from the following detailed description, taken in connection with the accompanying drawings, in which:

Figure 1 is a front elevational view of a pyrometer embodying the present invention;

Figure 2 is a side elevational view of the pyrometer shown in Figure 1;

Figure 3 is a rear elevational view of the pyrometer shown in Figure 1;

Figure 4 is a fragmentary longitudinal detail section on an enlarged scale, taken on the line 4—4 of Figure 3;

Figure 5 is a fragmentary longitudinal detail section on an enlarged scale, taken on the line 5—5 of Figure 2;

Figure 6 is a transverse detail section taken on the line 6—6 of Figure 5;

Figure 7 is a transverse detail section taken on the line 7—7 of Figure 5;

Figure 8 is a transverse detail section taken on the line 8—8 of Figure 5;

Figure 9 is a perspective view of one of the hairpin or U-shaped wires for supporting the tip of the thermocouple shown in Figures 1 to 3 and 5 to 8 on the thermocouple base; and Figure 10 is a perspective view of the L-shaped thermocouple base member.

Referring now to the drawings, the device illustrated comprises an indicator 10 having an extension arm 11 upon the end of which a plurality of different types of thermocouples are adapted for interchangeable mounting.

The indicator 10 comprises a metallic casing 17 secured to an insulating base 18 by screws 19. The casing 17 serves as a housing for a meter which may be of any conventional galvanometer or milli-voltmeter construction, such, for example, as the general type of construction shown and described in my Patent No. 1,597,327, issued August 24, 1926. The meter includes a pointer 20 and a pair of scales 21 and 22. The scale 21 is calibrated for high temperature indications, and the scale 22 is calibrated for low temperature indications as will hereinafter appear. Each scale 21 and 22 is graduated in terms of temperature, preferably in degrees of Fahrenheit. The casing 17 is provided with a handle 23 secured at 24 to the base 18.

The extension arm 11 comprises a tubular metallic member having an insulating sleeve 26 secured at 27 in the end of the same which is mounted on the housing 17. Encircling the sleeve 26 at spaced locations longitudinally thereof and secured rigidly on the sleeve by prick punches 28, or in any other suitable or preferred manner, are a pair of metallic collector rings 29 and 30. These collector rings 29 and 30 are insulated from one another and from the tubular arm 11 by the sleeve 26. A metallic terminal member 32 (Figure 4) is fitted in the sleeve 26 and secured therein by a screw 33. This terminal member 32 has an integral reduced and externally threaded stud 34 which extends out axially from the adjacent end of the extension arm and has a thumb nut 35 threaded thereon.

The lead wires 36 and 37, which electrically connect the particular thermocouple mounted on the outer end of the extension arm 11 to the indicator 10, extend through the tubular arm 11 and are insulated from this arm and from each other in any suitable or preferred manner. In the illustrated embodiment of the invention, these wires 36 and 37 extend through openings 38 and 39 in a small diameter insulator 40 which may be formed of porcelain or other suitable insulating material. This insulator 40 is shown of circular section, and extends substantially throughout the length of the tubular arm 11. At one end, the wire 36 passes out from the adjacent end of the insulator 40, transversely through the wall of the insulating sleeve 26, and is connected at 41 to the collector ring 29. The adjacent end of the other wire 37 passes out lengthwise from the insulator 40, and is connected at 42 to the terminal member 32. A short tubular insulator 43, of the usual fabric insulation or other suitable insulating material, surrounds the wire 37 between the terminal member 32 and the adjacent end of the insulator 40.

Disposed within the outer end of the insulating sleeve 26 and coiled about the terminal stud 34, or otherwise suitably disposed, is a resistance element 45. One end of this resistance element 45 is connected at 46 to the terminal stud 34, and the other end extends out transversely through a suitable opening in the wall of the sleeve 26 and is connected at 47 to the collector ring 30. An insulating washer may be provided at 48. The thumb nut 35 is operable to short circuit the resistance element 45, thereby connecting the lead wire 37 directly to the collector ring 30 through the terminal member 32 for low temperature readings on the scale 22, or to connect the wire 37 to the collector ring 30 through the resistance element 45 for high temperature readings on the scale 21.

When the nut 35 is out of contact with the adjacent end of the collector ring 30, for example, in the position shown in Figure 4, the circuit from the wire 37 is through the terminal member 32 and resistance element 45 to the collector ring 30, but when the nut 35 is threaded up into contact with the ring 30, as shown in dotted lines in Figure 4, the circuit is from the wire 37 and through the terminal member 32 and nut 35, directly to the collector ring 30, short circuiting the resistance element 45. The outer end of the terminal stud 34 has an axial threaded opening into which a headed screw 50 is threaded, the head of the screw 50 constituting a stop for limiting the outward threading movement of the nut 35 on the stud 34 to prevent unintentional displacement of the nut 35 from the stud 34.

For the purpose of mounting the extension arm 11 on the indicator housing, complementary insulating mounting blocks 52 and 53 are provided. The block 52 is rigidly secured to the under side of the insulating base 18, and has a pair of semi-circular grooved portions. A pair of semi-circular metallic collector ring parts 54 and 55 are positioned in spaced relation in these grooved portions and insulated, one from the other, by the block 52. These collector ring parts 54 and 55 are connected to the respective terminals of the meter coil (not shown) and are rigidly secured in place in the block 52. A pair of threaded posts 56, extending from the block 52, pass loosely through openings in the other block 53, and thumb nuts 57 are threaded upon the outer ends of these posts 56. As shown in Figure 4, screws 58 are threaded into the outer ends of the posts 56 and constitute stops for limiting the outward threaded movement of the nuts 57.

The block 53 has a pair of semi-circular grooved portions which are complementary to the grooved portions in the block 52, and a pair of semi-circular collection ring parts 60 and 61 are positioned in spaced relation in these grooved portions in the block 53. These collector ring parts 60 and 61 are insulated from each other by the block 53 and are complementary to and in registration with the collector ring parts 54 and 55. The internal diameters of the depressions in the blocks 52 and 53 between the collector ring parts 54 and 55 and 60 and 61, respectively, are preferably less than the internal diameters of the collector ring parts to present raised intermediate insulating portions 62 which fit between the collector rings 29 and 30 on the extension arm 11 when the end of this arm with these rings is inserted between the blocks 52 and 53. This facilitates positioning the inserted end of the extension arm so that the collector rings on the extension arm meet and properly contact the collector rings in the blocks 52 and 53.

The extension arm 11 is attached or mounted on the indicator 10 by loosening the thumb nuts 57 and separating the block 53 from the block 52 sufficiently to permit the adjacent end of the arm 11 to be readily placed between the blocks 52 and 53. The end of the arm 11, equipped with the collector rings 29 and 30, is then inserted between the blocks 52 and 53 so that the collector rings 29 and 30 are in position to meet and contact with the collector ring parts 54, 60, and 55, 61, respectively. The block 53 is then pushed down, and the arm 11 may be turned about its axis to the position desired, whereupon the thumb nuts 57 are tightened to clamp the arm 11 rigidly in place to the instrument with the circuit completed between the collector rings 29 and 30 and the coil of the meter mechanism within the housing 17. By loosening the thumb nuts 57, the extension arm may be turned about its axis to different angular positions or readily removed from the indicating instrument and handle unit of the device for insertion in a carrying case.

The outer end of the arm 11 is provided with a yoke or fork 65 for receiving any of the various types of thermocouples. This yoke 65 comprises, as shown in Figure 5, a pair of L-shaped metallic members 66 and 67 having apertured bases 68 and 69, respectively. These members 66 and 67 are assembled and insulated from each other by insulation 70 which may be mica or other suitable insulation. The adjacent end of the arm 11 is provided internally with a bushing 71 soldered or otherwise rigidly secured in place therein. Mica, "Bakelite," or other suitable insulation at 72 insulates the base 68 of the L-shaped fork member 66 from the adjacent end of the arm 11, and a tubular screw 74, headed at 75, passes through the openings in the bases 68 and 69 of the fork members 66 and 67 and has threaded engagement with the bushing 71 to secure the fork members rigidly in place on the outer end of the arm 11. Insulation at 76 insulates the screw 74 from the fork member 67. This insulation is backed by a channel-shaped metallic member 78, and the insulation 70 and 76 insulates the member 78 and the head of the screw 74 from the projecting legs of the fork members.

The insulator 40 passes axially through the tubular screw 74, and the lead wires 36 and 37 extend from the outer end of this insulator 40 and are connected by screws 80 and cooperating nut members, one to each of the fork members 66 and 67. The fork 65 thus constitutes not only a mechanical fork for supporting the various thermocouples but also an electrical fork through which the various thermocouples applied thereto are connected electrically to the lead wires 36 and 37. This eliminates the necessity for pigtail connections and the like, and is a distinct advantage.

The particular thermocouple 12 shown applied to the fork 65 is for temperatures of either metallic or non-metallic surfaces, whether the surface is soft or hard, clean or coated. It is especially suitable for plastic or rubber molds, platens, plates, glassware, walls or other rleatively flat surfaces. The unique construction reduces conduction loss to a minimum and gives maximum accuracy.

The thermocouple 12 comprises a mounting base consisting of an L-shaped metallic member 82 and a flat metallic member 83 insulated from each other by a fiber, "Bakelite," or other suitable insulating block 84 disposed therebetween. Mica or other suitable insulation at 85 insulates the apertured base of the member 82 from the adjacent end of the member 83. The member 82 is secured to the block 84 by screws 86 which are accessible (Figure 8) through openings 87 in the member 83, and which are applied to position with their heads countersunk in one side of the block 84 and thereby insulated from the member 83. The member 83 is similarly secured to the block 84 from the opposite side by screws 88 which are accessible through openings 89 in the member 82 and are applied to position with their heads countersunk in the opposite side of the block 84 and thereby insulated from the member 82.

The thermocouple mounting base is pivotally secured between the projecting legs of the fork 65 by coaxial screws 90. These screws 90 have heads at their outer ends, and, adjacent said heads, have cylindrical portions 91 which fit in openings 92 in the projecting legs of the fork 65. The reduced diameter inner ends of these screws 90 are threaded and have threaded engagement with correspondingly threaded openings in the metallic members 82 and 83 of the thermocouple mounting base. Phosphor bronze or other suitable washers 90′, between the heads of the screws 90 and the legs of the fork 65, provide friction tight joints which permit turning movement of the thermocouple base about the cylindrical portions 91 of the screws 90 and frictionally hold the base of the thermocouple in the different angular positions to which it is turned.

The ability of the thermocouple to be turned and held in any angular position about the common axis of the screws 90, together with the ability of the opposite end of the extension arm 11 to be rotated about the longitudinal axis of this arm and clamped in any angular position between the blocks 52 and 53, makes it possible to place the thermocouple unit in any position to contact the heated surface and with the front of the indicator 10 disposed toward the operator so that the temperature may be ascertained at a glance. This is another distinct advantage of the present invention.

The angular fork member 66 of the yoke 65 is preferably provided with a plus (+) marking indicated at 95 in Figure 2, and the angular member 82 of the thermocouple base is likewise preferably provided with a plus (+) marking indicated at 96 in Figures 2 and 10, or the parts are otherwise suitably marked to make sure that the thermocouple is properly applied to the yoke 65. If the thermocouple were applied with its plus (+) side in contact with the minus (−) side of the yoke 65, the instrument would read backwards.

The tip of the thermocouple 12 comprises a small diameter insulating tip 98 formed of porcelain or other insulating material which will withstand the high temperatures to which the device is subjected. The insulating tip 98, shown of circular section, is cemented or otherwise suitably secured in a metallic tip holder 99 of tubular form and provided with an annular base flange 100 at its inner end. A disc 101 of platinum, gold, or other suitable material, secured in place at the outer end of the tip 98 constitutes the hot junction of the thermocouple.

The lead wires 102 and 103 for the thermocouple extend through openings in the insulating tip 98 and are insulated from one another by this tip. The outer ends of these wires are welded or otherwise suitably joined to the disc 101. The wires 102 and 103 pass through openings 104 and 105 in a clamping plate 106 and in the base of the angular member 82, and extend through suitable openings in the insulating block 84 and are turned out and welded or otherwise connected at their opposite ends at 108 and 109, one to the metallic base member 82 and the other to the metallic base member 83. Thus, when the base member of the thermocouple is applied to the yoke 65, the contact between the yoke members 66 and 67 and the base members 82 and 83 completes the circuit between the lead wires 102 and 103 and the lead wires 36 and 37.

The tip of the thermocouple is supported an appropriate distance from the base of the thermocouple by two hairpin or U-shaped wires 115 preferably formed of steel wire, piano wire, or the like, so that they will be of great strength, and at the same time may be of small dimension. These wires 115 conduct very little heat, and at the same time they are yieldable to an extent so that the thermocouple will adapt itself to the surface to which it is applied.

In the illustrated embodiment of this form of thermocouple, the U-shaped wires 115 are applied with their legs extending through openings in the flange 100 of the tip holder 99. The bend 116 between the legs of each wire 115 is held between the flange 100 and shoulders formed by notches or upset portions 118 in the external periphery of the tubular extension of the tip support. At their free ends the extending legs of the wires 115 are turned out at right angles, and these right angle ends 120 are positioned in grooves 121 in the adjacent face of the L-shaped base member 82 and clamped therein by the clamping member 106 which has openings through which the wires 115 extend and an enlarged opening through which the lead wires 102 and 103 extend clear of the clamping member 106. The depths of the grooves 121 are preferably slightly less than the diameters of the wires 115, and the clamping member 106 is secured to the L-shaped base member 82 by screws 124.

When a high temperature thermocouple is applied to the fork 65, the nut 35 is threaded to position out of contact with the collector ring 39, thereby placing the resistance in circuit with the high temperature thermocouple for high temperature readings on the scale 21 of the indicator 10. On the other hand, when a low temperature thermocouple, such as the thermocouple 12, is applied to the fork 65, the nut 35 is threaded up into contact with the end of the collector ring 39, thereby short circuiting the resistance element 45 for low temperature readings on the scale 22.

I do not intend to be limited to the precise details shown or described.

I claim:

1. A pyrometer comprising, in combination, an indicator, extension means, means rotatably mounting said extension means on said indicator and including contact means on said indicator and contact means on said extension means having rotatable contact with the contact means on the indicator, and a thermocouple mounted on said extension means and connected in circuit with the contact means on said extension means.

2. In combination, an indicator, an extension arm, means on said indicator for mounting said extension arm for turning movement thereon and for securing said arm in different angular positions, terminals on the indicator, terminals on said arm for rotatable contact with the terminals on the indicator, a thermocouple pivotally mounted on said extension arm and adapted to be turned to different angular positions thereon, and means electrically connecting the terminals on said arm to said thermocouple.

3. In combination, an indicator, a tubular extension arm, a pair of insulating blocks on the indicator for receiving one end of said arm therebetween and for mounting said arm for turning movement and for securing same in different angular positions, collector ring parts on said blocks and connected to the indicator, collector rings on said arm for contact with the collector ring parts on said blocks, a thermocouple pivotally mounted on the outer end of said arm, and means disposed within said tubular arm and electrically connecting said thermocouple to the collector rings on the arm.

4. In combination, an indicator, an extension arm mounted on said indicator, a yoke on the outer end of said arm, said yoke comprising a pair of metallic yoke members insulated from each other, and a thermocouple adapted for support on said yoke and comprising a pair of thermocouple elements, one of said thermocouple elements being connected in circuit with said indicator through one of said yoke members and the other thermocouple element being connected in circuit with said indicator through the other yoke member.

5. In combination, an indicator, an extension arm secured to said indicator, a yoke on the outer end of said arm, said yoke comprising a pair of metallic yoke members insulated from each other, a thermocouple adapted for pivotal support on said yoke members and having metallic members insulated from each other and adapted for contact with said yoke members, and means electrically connecting said yoke members to said indicator.

6. In combination, an indicator, a tubular extension arm mounted at one end on said indicator for turning movement about its axis and adapted to be secured in different angular positions, a yoke on the outer end of said arm, said yoke comprising a pair of metallic yoke members insulated from each other and from said arm, conductors extending through said arm and electrically connecting said indicator to said yoke members, and a thermocouple pivotally supported on said yoke and having metallic members insulated from each other and electrically contacting said yoke members.

7. In combination, an indicator having a high temperature scale and a low temperature scale, terminals on said indicator, an extension arm mounted on said indicator and having contacts thereon for contact with said terminals, metallic yoke members insulated from each other and from said arm and mounted on the outer end of said arm, a resistance element connected between one of said yoke members and one of the contacts on said extension arm, means connecting the other yoke member to the other contact on said extension arm, and means for short circuiting said resistance element for low temperature readings on the low temperature scale and operable to position in which said resistance element is in circuit with said indicator for high temperature readings on said high temperature scale.

8. In combination, an indicator having a high temperature scale and a low temperature scale, terminals on said indicator, an extension arm mounted on said indicator and having terminals for contact with the terminals on the indicator, a terminal member at the mounted end of said arm, a thermocouple detachably mounted on the outer end of said arm with one side connected to one of the first terminals on said arm and the other side connected to said terminal member, a resistance element connected between said terminal member and the other terminal on said arm, and a nut threaded on said terminal member and adjustable into and out of contact with said last terminal for connecting the thermocouple circuit to the indicator through said resistance element and for short circuiting said resistance element.

9. In combination, an indicator having scale means, a tubular extension arm mounted at one end on said indicator for turning movement about its axis and adapted to be secured in different angular positions, a yoke on the outer end of said arm, a thermocouple pivotally mounted on said yoke, conductors extending through said arm and electrically connecting said indicator to said thermocouple through said yoke, a resistance element, and means on the inner end of said arm for connecting the yoke to said indicator through said resistance element and for short circuiting said resistance element for the purpose of controlling the calibration of said scale means.

10. A pyrometer comprising, in combination, an indicator, extension means, means rotatably mounting said extension means on said indicator and including contact means on said indicator and contact means on said extension means having rotatable contact with the contact means on the indicator, a thermocouple, insulated means pivotally mounting said thermocouple on said extension means, and means connecting the thermocouple in circuit with the contact means on said extension means.

11. A pyrometer comprising, in combination, an indicator, extension means, means rotatably mounting said extension means on said indicator so that said extension means may be turned to different angular positions about its longitudinal axis and relative said indicator, said mounting comprising contact means, contact means on said extension means for rotatable contact with said first mentioned contact means, and a thermocouple mounted on said extension means and connected in circuit with said indicator through said contact means.

12. A pyrometer comprising, in combination, an indicator, a pair of contacts mounted on said indicator, a tubular extension arm mounted on said indicator and having a pair of contacts one in rotatable contact with each of said first contacts, said extension arm being adapted to be turned for movement relative to the indicator to different angular positions about its longitudinal axis, and a thermocouple pivotally mounted on said extension arm and comprising thermocouple elements connected in circuit with the contacts on said extension arm.

13. A pyrometer comprising, in combination, an indicator, a pair of contacts mounted on said indicator, a tubular extension arm mounted on said indicator and having a pair of contacts one in rotatable contact with each of said first contacts, said extension arm being adapted to be turned for movement relative to the indicator to different angular positions about its longitudinal axis, a yoke on the outer end of said arm and comprising a pair of metallic yoke members insulated from each other, and a thermocouple supported on said yoke and comprising a pair of thermocouple elements one of said thermocouple elements being connected in circuit with said indicator through one of said yoke members and the other thermocouple element being connected in circuit with said indicator through the other yoke member.

14. In a device of the class described, a tubular extension arm, a thermocouple mounted at the outer end of said arm, an insulating sleeve on the inner end of said arm, a pair of contact rings mounted on said insulating sleeve, and thermocouple leads extending through said extension arm and connected to the respective contact rings.

15. In a device of the class described, a tubular extension arm, a thermocouple mounted at the outer end of said arm, an insulating sleeve on the inner end of said arm, a pair of contact rings mounted on said insulating sleeve, a terminal member mounted in said insulating sleeve, a thermocouple lead extending through said extension arm and connected to one of said contact rings, a second thermocouple lead extending through said arm and connected to said terminal member, resistance means connected between said terminal member and the other contact ring, and a nut having threaded engagement with said terminal member and adapted to be threaded into and out of contact with said other contact ring.

JOHN A. OBERMAIER.